Patented May 7, 1935

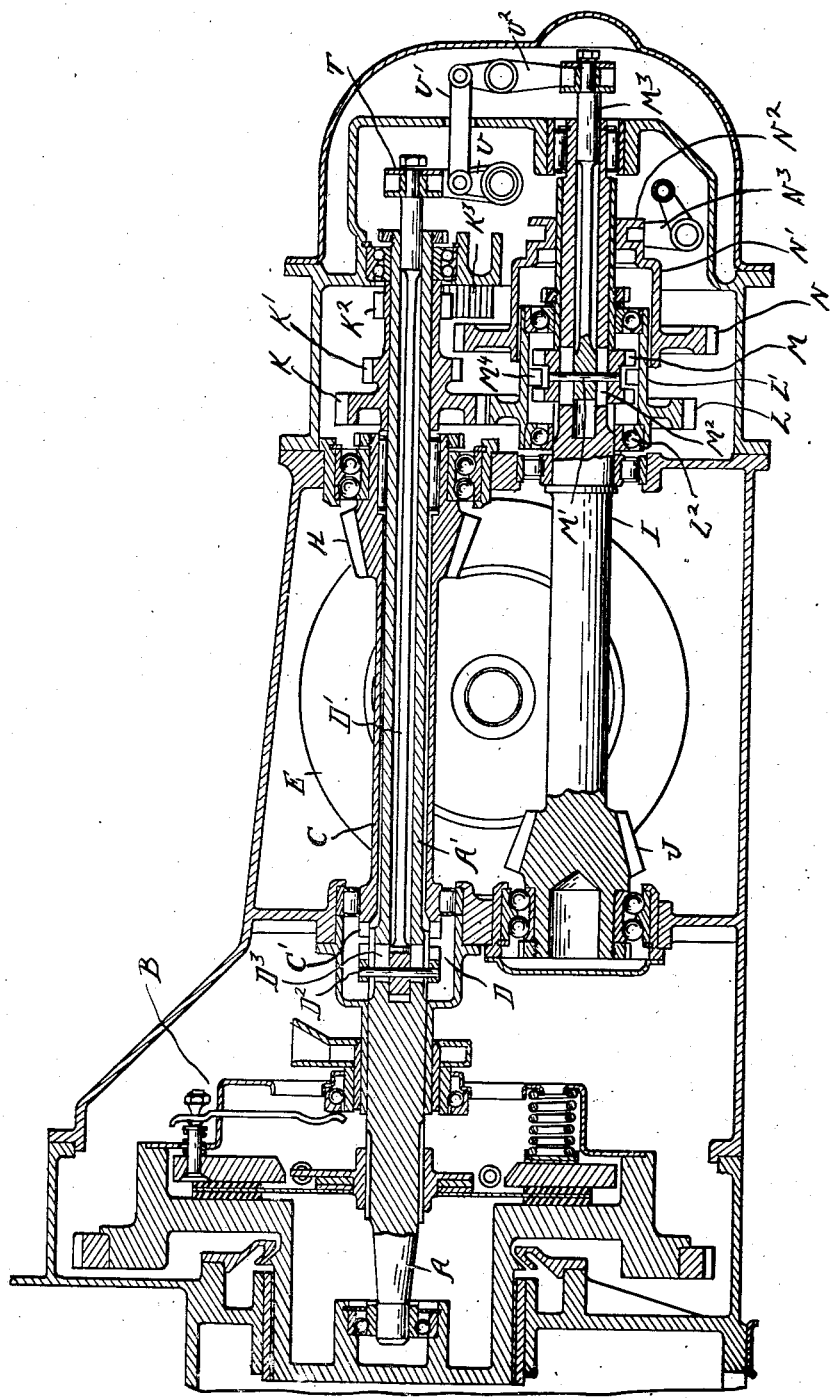

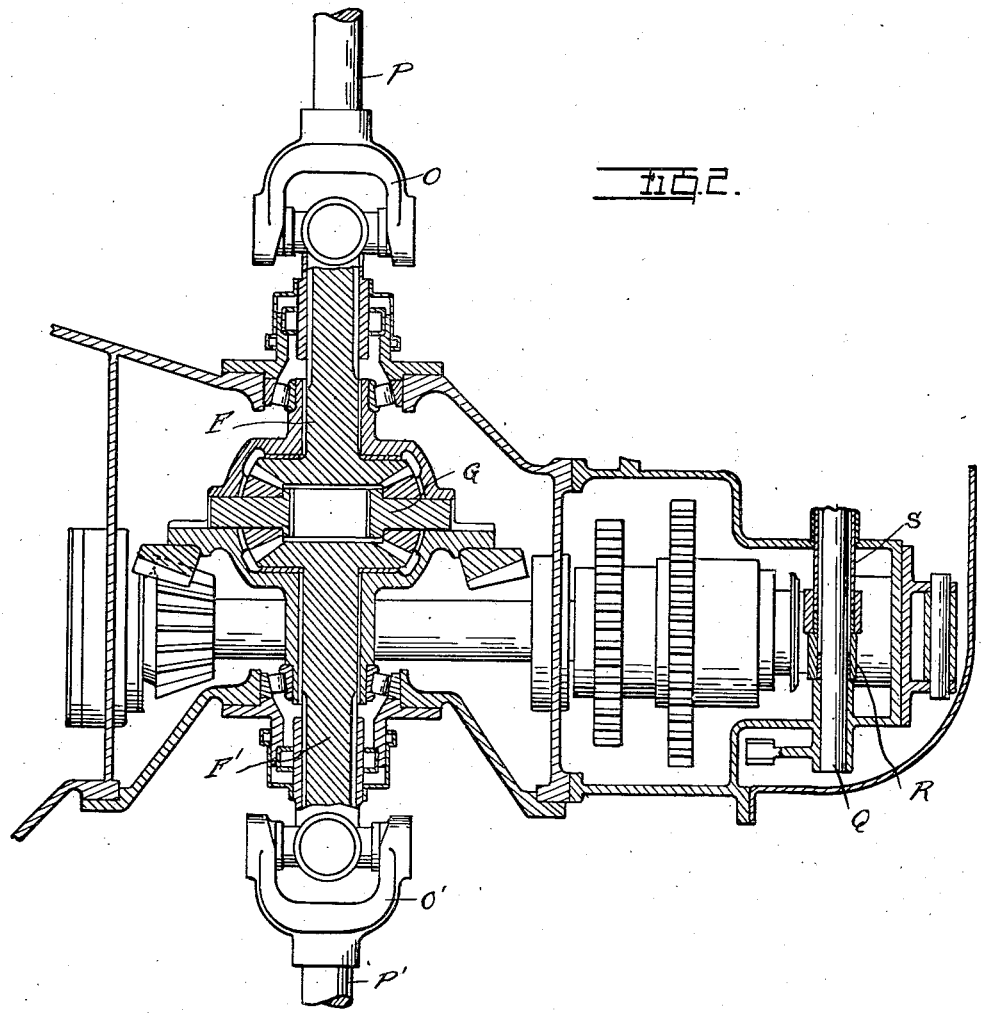

2,000,605

UNITED STATES PATENT OFFICE 2,000,605

TRANSMISSION MECHANISM

Alfred Moorhouse, Detroit, Mich.

Application August 14, 1933, Serial No. 685,095

3 Claims. (Cl. 74—326)

The invention relates to transmission mechanisms more particularly designed for use in connection with motor vehicles having front wheel drive, but also applicable to other uses. It is the primary object of the invention to obtain a construction in which the longitudinal dimension between the motor and the transversely extending driven shaft is greatly reduced. It is a further object to condense the variable speed transmission so as to occupy less space, and at the same time to simplify the construction. With these objects in view the invention consists in the novel construction as hereinafter set forth.

In the drawings:

Fig. 1 is a central longitudinal section through my improved transmission;

Fig. 2 is a sectional plan view thereof.

In transmission mechanisms used in motor vehicles having front wheel drive, it is usual to place the variable speed transmission intermediate the motor and the transversely extending driven shaft. Inasmuch as the motor is necessarily arranged forward of the driver's seat, there is not sufficient distance between the same and the front axle for such an arrangement which necessitates extending the transverse transmission shafts obliquely. With my improved construction the transverse transmission shafts may be arranged in the vertical plane of the front wheel, without alteration in the usual position of the motor and main clutch. This is accomplished by placing the variable speed transmission forward of the plane of the transverse transmission shafts and in space rendered available by the present practice in motor body construction of providing forwardly inclined radiator shells.

In detail, A is the drive shaft directly connected to the motor through the medium of the main clutch B which may be of any suitable construction. The forward portion A' of this shaft A is tubular and extends beyond the vertical plane of the front wheels. C is a tubular shaft revolubly supported upon the portion A' of the shaft A and provided at its rear end with clutch jaws C' adapted for engagement with an axially movable clutch member D on the shaft A. This clutch member is actuated by a rod D' passing centrally through the tubular shaft A', being connected thereto by a pin D² passing through longitudinal slots D³ in the shaft A'.

E is a ring gear connected to transversly extending shafts F and F' through the medium of a differential gearing G. This ring gear is of the type known as hypoid which permits of arranging its axis below the axial plane of the shaft A. H is a pinion on the tubular shaft C engaging the ring gear E on the side forward of the shafts F and F', the arrangement being such that when the clutch member D couples the shaft A with the shaft C, direct drive is communicated from the engine to the ring gear, and the shafts F and F'.

As previously stated, the variable speed transmission mechanism is arranged forward of the front wheels. To simplify the construction of this gearing and to reduce its dimensions, I have dispensed with the usual countershaft and use in place thereof a second driven shaft I parallel to the shaft A' and connected to the ring gear E by a second pinion J. This pinion is arranged upon the opposite side of the ring gear or upon the rear side of the plane of the shafts F and F', so that rotation of the shaft in opposite directions from the rotation of the shaft A' will communicate motion to said ring gear in the same direction. This simplifies the construction of the gearing through which variable speeds are obtained. Thus intermediate forward speed is obtained through constant mesh gears K and L, the former keyed to the shaft A' and the latter rotatively mounted upon the shaft I. The hub L' of the gear wheel L is mounted on the shaft I through the medium of ball bearings L² and has a recess centrally therewithin in which is arranged an axially shiftable clutch collar M. This is coupled to the shaft I by a pin M' passing through longitudinal slots M² in said shaft, and an actuating rod M³ is arranged in a central recess or bore in said shaft and coupled to said pin. The collar M has a pair of spaced jaws which in neutral position are arranged upon opposite sides of internal clutch jaws M⁴ on the hub L'. Thus by moving the rod M³ in either direction from its neutral position, the jaws of the collar M will be engaged with the jaws M⁴ of the hub L, thereby communicating movement from the shaft A' through the gears K and L to the shaft I and through the pinion J to the ring gear E.

The gear wheel K is preferably one of a cluster including the gear wheels K' and K². N is a gear wheel rotatively fixed but longitudinally slidable upon the hub L' and which may be alternatively engaged with the gear wheel K' and with a reversing gear K³ in mesh with the gear wheel K². The hub N' of the gear wheel N has a grooved collar N² for engaging a gear shifter N³ through which said gear may be adjusted to the desired position. Thus it will be seen that low speed is communicated to the ring gear E through the medium of the gear wheels K', N, shaft I and pinion J. Intermediate speed is obtained as previously described and reverse drive through the medium of the gear wheels K², K³ and N'. In other words, all of the speeds other than high speed are transmitted through the shaft I and pinion J, whereas high speed is directly communicated from the shaft A to the tubular shaft C and through the pinion H to the ring gear E. The shafts F and F' driven by the ring gear communicate their motion through universal joints O O' to shafts P P' leading to the wheels.

Control mechanism

The control mechanism for the transmission may be of any suitable construction and forms no part of the present invention. I have, however, shown a rock shaft Q having sleeved thereon concentric rock shafts R and S for alternative rocking movement. On one of these rock shafts is a rock arm T pivotally connected to the rod D' for operating the clutch D. On another rock shaft is the rock arm U connected by a rod U' with a lever U², the opposite end of which is connected to the end of the rod M³ for operating the clutch collar M. A third shaft is connected by a linkage (not shown) with the shifter N³.

What I claim as my invention is:

1. The combination of a pair of parallelly arranged shafts, one of which is tubular, a shaft having its axis transverse to the axes of said parallel shafts and intermediate the same, a ring gear on the latter shaft, pinions on said parallel shafts intermeshing with said ring gear on opposite sides of the axis thereof, a drive shaft passing through said tubular shaft and projecting beyond the same, variable speed gearing between the projecting portion of said drive shaft and the other of said parallel shafts for imparting thereto different angular speeds less than that of the drive shaft and means for directly clutching said drive shaft to the end of said tubular shaft opposite that carrying said pinion to transmit to the latter the same angular speed.

2. The combination of a pair of parallelly arranged shafts, a shaft having its axis transverse to the axes of said parallel shafts and intermediate the same, a ring gear on the latter shaft, pinions on said parallel shafts intermeshing with said ring gear on opposite sides of the axis thereof, a drive shaft axially aligned with one of said parallel shafts, a pair of constant mesh gears between said drive shaft and the other of said parallel shafts for transmitting to the latter movement at a lower angular speed, a clutch between one of said pair of gears and the shaft on which it is mounted, one or more other pairs of gears between the same shafts including an axially shiftable member, and means for directly clutching said drive shaft with the shaft in alignment therewith.

3. A transmission mechanism for motor vehicles comprising a drive shaft extending longitudinally of the vehicle and a driven shaft extending transversely thereof and in a plane offset from the plane of said drive shaft, a shaft parallel to said drive shaft in a plane on the opposite side of the axis of said transverse shaft, a tubular shaft sleeved upon said drive shaft, a ring gear on said transverse shaft, pinions on said tubular shaft and the shaft parallel thereto for engaging said ring gear on opposite sides of its axis to impart thereto movement in the same direction by movements in the opposite direction of the pinion shafts, a plurality of differential pairs of gears connecting said drive shaft with the shaft parallel thereto and including one pair of constant mesh gears and one or more pairs of gears having an axially shiftable element, a shifter for said axially shiftable gear, a clutch for coupling one of said constant mesh gears with the shaft on which it is mounted, a clutch for connecting said tubular shaft with said drive shaft, an actuating rod for the movable member of said clutch passing through a tubular portion of said drive shaft and a pin connected to said rod passing through slots in said drive shaft into engagement with the movable member of said clutch.

ALFRED MOORHOUSE.